United States Patent [19]

Granryd

[11] 4,068,732
[45] Jan. 17, 1978

[54] FOUR SPROCKET WHEEL DRIVE SYSTEM FOR TRACK-TYPE VEHICLE

[76] Inventor: Thorvald G. Granryd, 825 N. Sheridan Road, Lake Forest, Ill. 60045

[21] Appl. No.: 621,699

[22] Filed: Oct. 14, 1975

[51] Int. Cl.² .................. B62D 11/04; B62D 55/30
[52] U.S. Cl. ......................................... 180/6.7; 305/27
[58] Field of Search .............. 180/6.7, 6.48, 9.2, 180/11; 305/21, 25, 27, 28; 172/801

[56] References Cited

U.S. PATENT DOCUMENTS

| | | | |
|---|---|---|---|
| 1,138,453 | 5/1915 | Castern | 180/6.7 |
| 1,824,086 | 9/1931 | Knox | 305/27 X |
| 2,734,292 | 2/1956 | Graves | 172/801 X |
| 3,017,942 | 1/1962 | Gamaunt | 180/9.2 R |
| 3,334,702 | 8/1967 | Granryd | 180/11 |

FOREIGN PATENT DOCUMENTS 1,151,201  7/1963  Germany ................. 180/6.7

Primary Examiner—Joseph F. Peters, Jr.
Assistant Examiner—John A. Pekar

[57] ABSTRACT

A track-type vehicle comprising novel means for obtaining propulsion, superior maneuverability and improved riding characteristics through four individually-driven sprocket wheels providing power for its track chain assembly. The vehicle is powered by two engines transversely mounted at either end of the vehicle. By controlling the speed and direction of each track chain assembly independently of the other, various turning radii are possible, ranging from a quick pivot to a gradual curve. Each track chain assembly is supported by a plurality of pivotal bogie wheel assemblies. The bogies move in a reciprocal manner and are pivoted at the point of attachment to the vehicle and at the wheel assembly itself. The track chain assembly is automatically adjusted to a suitable tension for a smooth ride and a long wear life of the chain assembly.

5 Claims, 5 Drawing Figures

A-A

FOUR SPROCKET WHEEL DRIVE SYSTEM FOR TRACK-TYPE VEHICLE

BACKGROUND OF THE INVENTION

This invention relates to track-type vehicles and, in particular, to crawler vehicles having individually-driven sprocket wheels with separate transmission and torque convertors providing superior maneuverability and proven riding characteristics. Crawler dozers and loaders in current use in the construction industry are generally equipped with a single engine and transmission which drives a single pair of sprocket wheels through a final drive assembly which is ordinarily located at the rear portion of the vehicle. Each sprocket wheel has clutch and brake mechanisms incorporated into the final drive assembly, and with these control mechanisms, an operator drives and steers a set of continuous tracks or track chain assemblies on each side of the vehicle. For a quick turn, one track chain assembly is braked and the clutch employed while the track chain assembly on the opposite side remains moving. The degree of turn depends on the amount of braking and clutching action applied to the one side.

The track chain assemblies are usually tensioned by means of an idler wheel located at the front end of the continuous tread which generally exerts a constant resilient force on the idler wheel. Thus, when an obstacle is encountered, the track chain assembly can accommodate the obstacle while maintaining the same tension throughout. This resiliency of the track chain assembly reduces its wear and increases its maneuverability through all types of terrain.

On track-type vehicles, ground adhesion can be enhanced by the provision of pivoting means which are a part of the track chain assembly and aid in retaining maximum contact between the ground surface and the tread surface. The normal arrangement allows the track chain assembly to follow the ground regardless of its contour.

Although the above-described vehicles, in general use, satisfactorily perform and are in general acceptance at the present time, they all have some notable disadvantages in common; for instance, not only do the sprocket wheels provide for the driving power for the vehicle, but they also support a substantial portion of the total vehicle weight. As a direct result of this arrangement, not only the sprocket wheels, but the drive train and accessories, must have the capability of supporting the weight of the vehicle. They must also be able to withstand the stresses and strains associated with propelling such a heavy vehicle over such rough terrain.

Further, with the sprocket wheels being a part of the support structure of the vehicle, they must necessarily be directly on the ground, separated only by the tractor tread. This position subjects the sprocket wheel to a direct contact with whatever surface the vehicle may be traversing at the time, e.g., mud, rocks, sand and other abrasive materials. This direct contact of the sprocket wheels with these abrasive materials greatly accelerates the wear of critical parts on both the sprocket wheel and its associated supporting mechanisms. Thus, the general area of the final drive assembly and the track chain assemblies have often proven to be the weak point of the vehicle in respect to both down time and over-all maintenance costs. Since this general area of a track-type vehicle represents a substantial portion of the development and tooling costs of a new model and makes up a good portion of the total vehicle cost, an improvement obviating these difficulties is long-awaited in the industry.

Therefore, it is an object of this invention to limit the function of the sprocket wheels to propelling and maneuvering a track-type vehicle.

It is another object of this invention to position the sprocket wheels at an elevated distance from the ground, thereby minimizing contact with abrasive material.

It is yet another object of this invention to maintain maximum ground contact with the track chain assembly of track-type vehicles.

A further object of the present invention is a larger track-type vehicle with the utilization of multiple propulsion assemblies obtained from other models, well-proven in the field, with a minimum of development and expense.

Yet another object of the invention is to produce useful work while operating in either forward or reverse direction to a greater extent than by conventionally designed track-type vehicles.

These and other objects are attained in accordance with the present invention wherein there is provided a track-type vehicle having four individually-driven sprocket wheels providing power for the track chain assembly. The rotary motion of each sprocket wheel is controlled by a transmission and a torque convertor assembly which are adjacently mounted. A transversely-mounted engine powers each pair of sprocket wheels, one in the front and the other in the rear of the vehicle. Conventional transmission and steering mechanisms control the vehicle and, in conjunction, allow both sharp and regular pivotal turns while the vehicle is in motion. Each track chain assembly is resiliently and pivotally tensioned for a smooth ride no matter how rough the terrain.

DESCRIPTION OF THE DRAWINGS

Further objects of the invention with additional features contributing thereto and advantages accruing therefrom will be apparent from the following description of one embodiment of the invention when read in conjunction with the accompanying drawings, wherein:

Referring now to FIG. 1, there is shown the principal arrangement of components pertaining to sprocket wheels and the track chain assembly which are identical on both sides. Front and rear sprocket wheels 10 and 11, respectively, drive the endless track chain assembly 52. The vehicle is supported on three sets of bogies, containing track rollers. The front and rear bogies 13 and 14, respectively, are identical, comprising two track rollers 15, 16, 15B and 16b, respectively. Each pair is individually rotatable and connected to their respective frame members 17 and 18, and the rollers 16 and 16b rotate on an axis which also pivotally secures the frame members 17 and 18, respectively, to the vehicle main frame 19 as shown. The pivoting action of bogies 13 and 14 is controlled by resilient bogie supporting structures 20 and 21, incorporating either heavy duty coil springs, as commonly used for such purposes, or nitrogen accumulator, also in common use. Each supporting assembly 20 and 21 is pivotally connected to bogie frame 17 and 18, respectively, by pins 22 and 23, respectively. On the opposite end, assemblies 20 and 21 are pivotally secured to the main frame 19 by pins 24 and 25, respectively.

Figure 1:
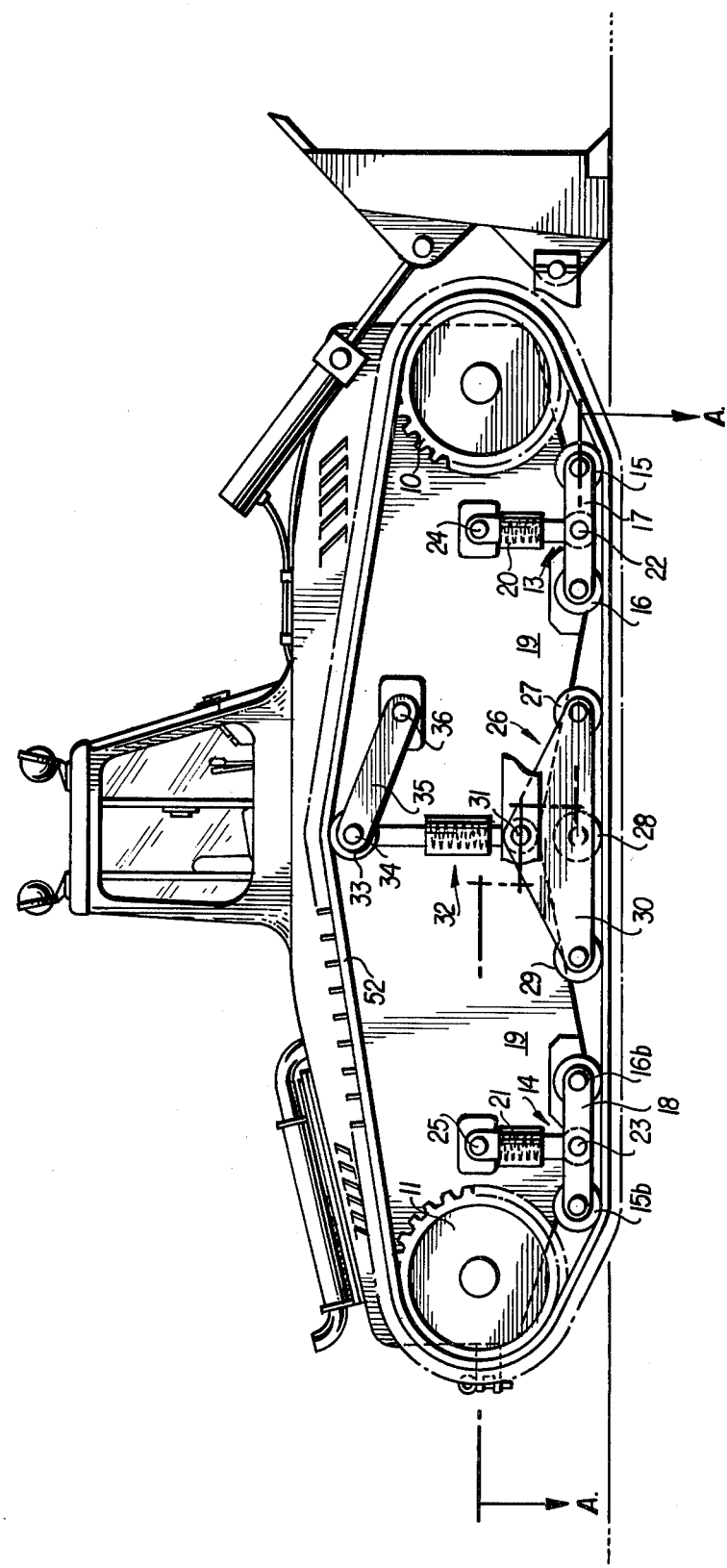
FIG. 1 is a side elevation of the present invention as embodied in a crawler dozer.

The center bogie assembly 26 has three track rollers 27, 28 and 29, each rotatably connected to the frame member 30, which itself is pivotally connected to the main frame 19 by pin 31.

Track tension adjuster assembly 32, incorporating heavy duty coil springs, is pivotally secured to the main frame 19, as by a pin 31. At the opposite end of the adjuster assembly 32, a support roller 33 is rotatably connected by pin 34 and is biased against the tractor adjuster assembly 32. Linkage 35 is pivotally connected to the pin 34 at one end and also pivotally secured at the opposite end of the main frame 19 by a similar pin 36.

By the above-described bogie assemblies, the vehicle weight is totally supported by the track rollers, comprising seven rollers on a side. The two bogie supporting means 20 and 21 can be adjusted to place equal load stress on all track rollers.

Because of its pivotal construction in combination with the spring action, track rollers 15 and 15b are capable of conforming to obstacles in the terrain as well as to those obstacles which may become trapped between the track chain assembly 52 and the sprocket wheel. The resilient mounting of front and rear bogies 13 and 14 will also contribute to a smoother more comfortable ride on uneven terrain than is obtainable with conventionally designed crawlers.

This latter advantage of a smooth ride is further enhanced by virtue of the pivoting characteristics of center bogie 26; stop for limiting the degree of pivoting of the center bogie 26 may be secured to main frame 19, but for purposes of clarity are not shown in FIG. 1.

Figure 2:
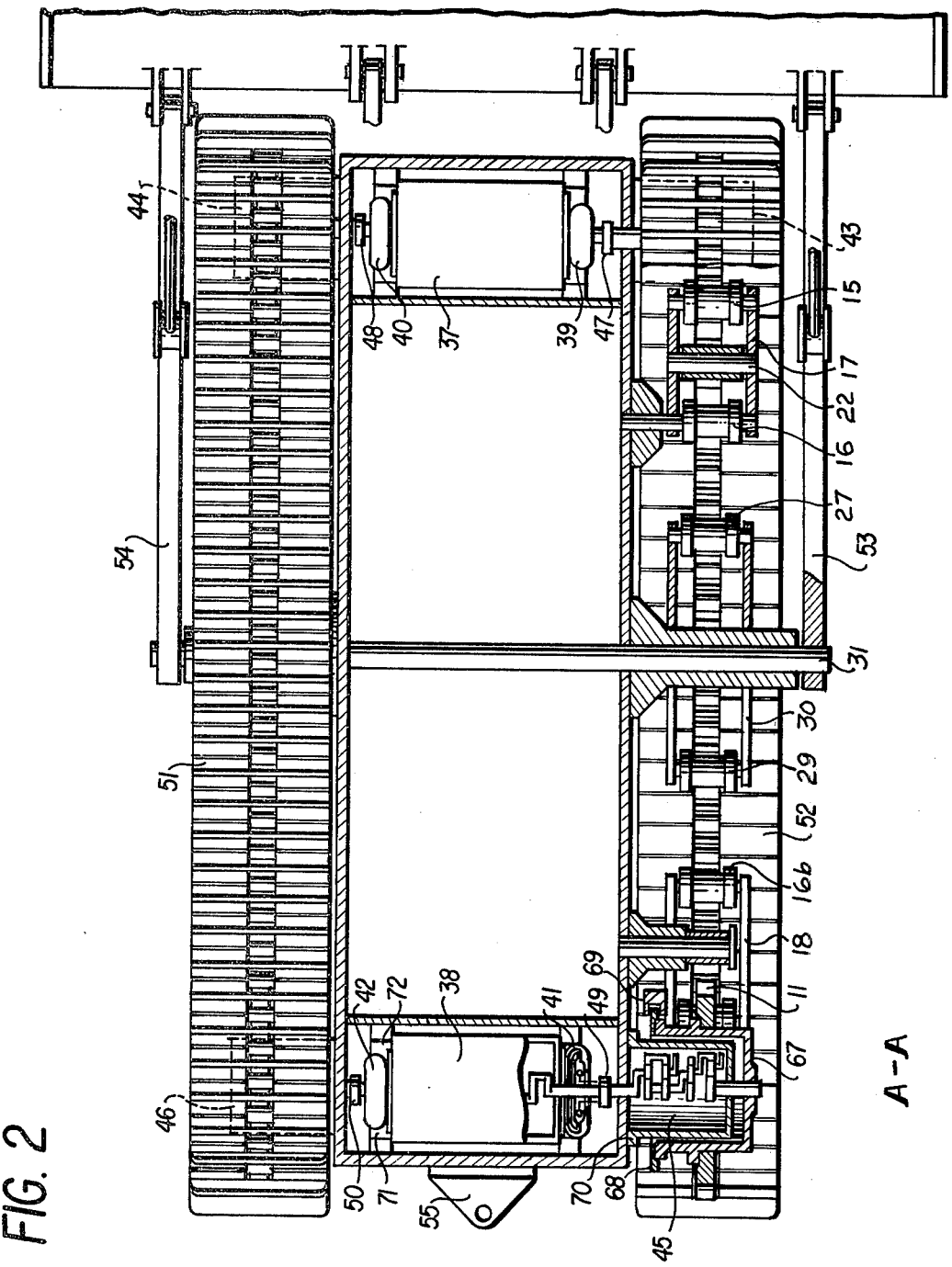
FIG. 2 is a top plan view of the present invention with a partial cross section A—A of one of the track chain assemblies.

Section A—A of FIG. 1, shown in FIG. 2, further illustrates the principal configuration of the bogie assemblies as pivotal to allow them to better conform to the contours of the ground.

As in U.S. Pat. No. 3,334,702 and my co-pending application Ser. No. 591,334, Filed June 30, 1975, this invention also employs two identical engines, 37 and 38, both transversely mounted, for driving the front and rear pair of sprocket wheels, respectively. Each of the two engines 37 and 38 drives a pair of torque convertors 39, 40, 41 and 42, respectively.

These four torque convertors are identical in design, power absorption and other characteristics with the exception that the blade angle of rotating elements for one pair is opposite from that of the other pair. This arrangement facilitates power absorption at a clockwise input rotation for one pair and a counter-clockwise input rotation for the other. This option in blade angle is well known in the art and will not be described in further detail.

The output shaft of each torque convertor is connected to the input shaft of powershift transmissions 43, 44, 45 and 46, through four universal joints 47, 48, 49 and 50, respectively. The four latter joints, as well as the four transmissions are of identical design; the transmissions are preferably of planetary type, but a countershaft type may also be used. These transmissions incorporate forward and reverse modes and also two, three or four speed ranges. The cross-section A—A depicts a planetary type, full forward and reverse, two speed transmission 45. This particular planetary gearing arrangement shown lends itself well to obtaining the quite large overall speed reduction ratios that are required for driving the sprocket wheel at the proper rotational speeds as will be discussed hereinafter. Each transmission must be rigidly secured to the main frame 19.

As in a typical dozer assembly the mounting of dozer push-arms 53 and 54 and a drawbar assembly 55 facilitate the mounting of a varied number of accessories. These components relate to items in general use and as such will not be described further.

Figure 3:
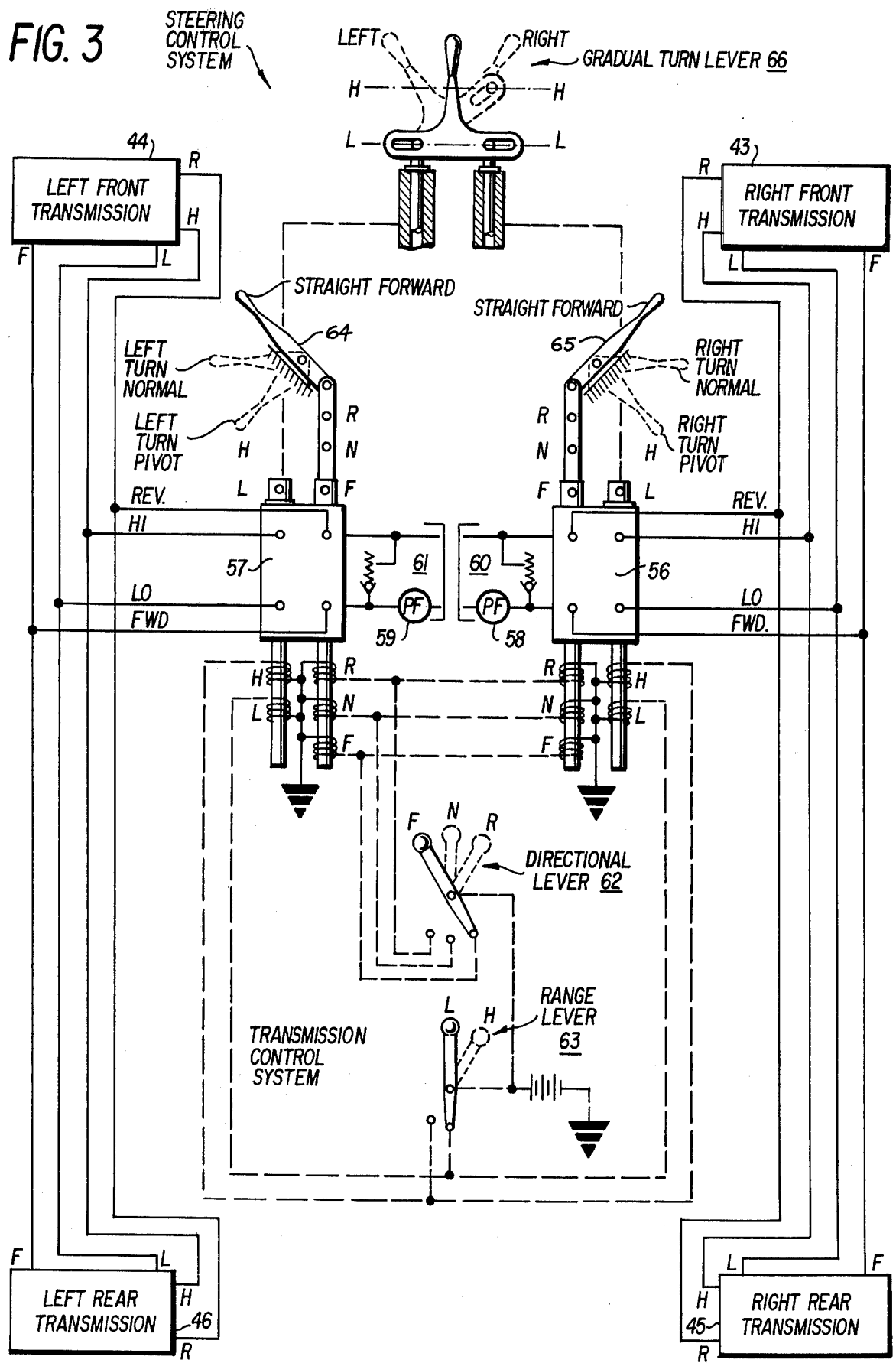
FIG. 3 is a schematic diagram of the transmission and steering control system.

FIG. 3 is a schematic diagram illustrating one method of controlling the mode of propulsion as well as the manner of maneuvering the crawler. The right side transmissions 43 and 45 are controlled by right side transmission control valve 56 through manipulation of the lever 65 as will be described; and, are connected by fluid conduits in parallel. The left side transmissions 44 and 46 are connected in similar manner to the left side transmission control valve 57, for control of the speed and direction of the left side track chain assembly through manipulation of the lever 64.

Control valves 56 and 57 are identical in design and are connected to hydraulic pumps 58 and 59, respectively, which provide hydraulic fluid under pressure to engage the various transmission clutches through the aforementioned fluid conduits. Reservoirs 60 and 61, respectively, contain the hydraulic transmission fluid required by the control system and, in the usual fashion, serve to supply oil to said pumps as well as receive discharged fluid from the clutches as they are being disengaged as well as fluid flow through pressure relief valves.

Each control valve contains two control plungers, their position determining which of the transmission clutches are engaged and which are disengaged. Their respective positions are here shown as being controlled electrically by means of solenoid coils. Each coil is connected to the electrical system of the vehicle and actuated by directional control lever 62 and range control lever 63, each pivotally secured as shown. In the diagram hydraulic conduits, plunger positions and control lever positions are marked appropriately to denote the transmission gearing corresponding to Forward, Neutral, Reverse, High Range and Low Range. Thus, from the position of the transmission control levers 62 and 63, the diagram illustrates that the vehicle is going Forward in Low Range.

"The valves 56 and 57 are shown as a simplified embodiment for clarity. Reduced to practice commercially available 2-position and 3-position hydraulic directional solenoid valves, equipped with override plungers, will perform various modes of steering. Such valves are disclosed in Bulletin SD19 from Waterman Hydraulics, 6565 Howard Street, Chicago, Ill., 60648. Activating override plungers in such valves will perform same functions as the arrangement shown and as will be described in the immediate following."

To facilitate steering of the vehicle the plungers of the transmission control valves extend at opposite ends of the valve bodies. The end of each plunger is mechanically connected to steering control levers 64, 65 and 66, each lever pivotally secured as shown. The position of each of said three steering control levers will normally be determined by the position of these transmission directional and range levers 62 and 63 by virtue of certain solenoid coils being energized. However, these positions may be overruled by means of a mechanical force imposed upon the steering control levers 64, 65 and 66. Thus, an operator of the vehicle may maneuver these levers in a mode determined by the position in which he holds either one of the said steering control levers. It should be noted that in some applications left and right foot pedals might be employed instead of the left and right hand steering levers shown. From the position of the steering control levers 64, 65 and 66, as shown in the diagram, the crawler is moving straight in Forward directiion and in Low Range.

By pulling and holding the left hand steering lever 64 the crawler will turn to the left in either of two modes. The operator may turn in a generally conventional mode by holding the lever 64 in its first or normal position. This first position causes the two left side transmissions 44 and 46 to become disengaged which brings the left side track chain assembly 51 to a standstill. Simultaneously, the right side track chain assembly 52 of FIG. 2 continues to move forward at a predetermined speed, depending upon the position of the transmission range lever 63. The operator may also turn the vehicle in a pivotal mode by pulling further on lever 64 and holding it in its rearmost or pivot position. This position causes the two left side transmissions 44 and 46 to engage in reverse. The left side track chain assembly 51 is then in reverse while, simultaneously, the right side track chain assembly 52 continues ahead in forward. Both 51 and 52 of FIG. 2 remain in motion at the same rate of speed, though in opposite directions, as determined by the position of transmission range lever 63.

The vehicle can make a right turn in a similar manner as described above by actuating the right hand steering lever 65.

Additionally, the crawler may perform gradual and controlled radius turns by actuating gradual turn lever 66. For clarity in the diagram a separate cross section illustrates the intended function of lever 66. This lever is connected to the two range control plungers of the transmission control valves 56 and 57. By moving the lever 66 towards the left and holding it there the operator will perform a gradual left turn since the range control plunger of left side valve 57 will then be in its low range position while the range control plunger of right side valve 56 will be in its high range position. Thus, the left side transmissions 44 and 46 will power the left side track chain assembly 51 in low range while, simultaneously, right side transmissions 43 and 45 will power the right side track chain assembly 52 in high range. A gradual right turn is performed in a similar manner with lever 66 moved to the right.

It should be noted that should transmissions 43, 44, 45 and 46 contain more than two speed ranges, then this will make it possible to engage various combinations of left and right side transmission speed ranges and thus achieve a wider selection of gradual turn radii.

The braking of the crawler occurs by means of a mechanism shown in cross section A—A of FIG. 2, particularly the portion showing transmission 45 and sprocket wheel 11. The sprocket wheel 11 is secured to the hub 67; this hub also incorporates a flange, to which the brake disc 68 is secured. Braking action is accomplished by applying fluid pressure onto the brake caliper 69 in the usual manner. The four identical disc brake assemblies shown are described for illustrative purposes only and are not meant to exclude the use of other brake types. The calipers for each sprocket wheel are connected through fluid conduits to a foot-brake pedal, in the usual manner. This same brake pedal is also connected to a ratchet means for purposes of setting the pedal at some fixed position, whereby the calipers are applied and remain applied while the vehicle is parked. To insure that the calipers stay applied while parked over long periods of time, the brake circuit may contain an accumulator, in a manner known in the art.

Ease of servicing can be an important factor in the evaluation and selection of construction machinery. An important part of this consideration relates to the removal and reinstallation of the main components and assemblies, such as, transmission, torque convertors and engines. The approach of the present invention affords improvements in these latter respects.

Figure 4:
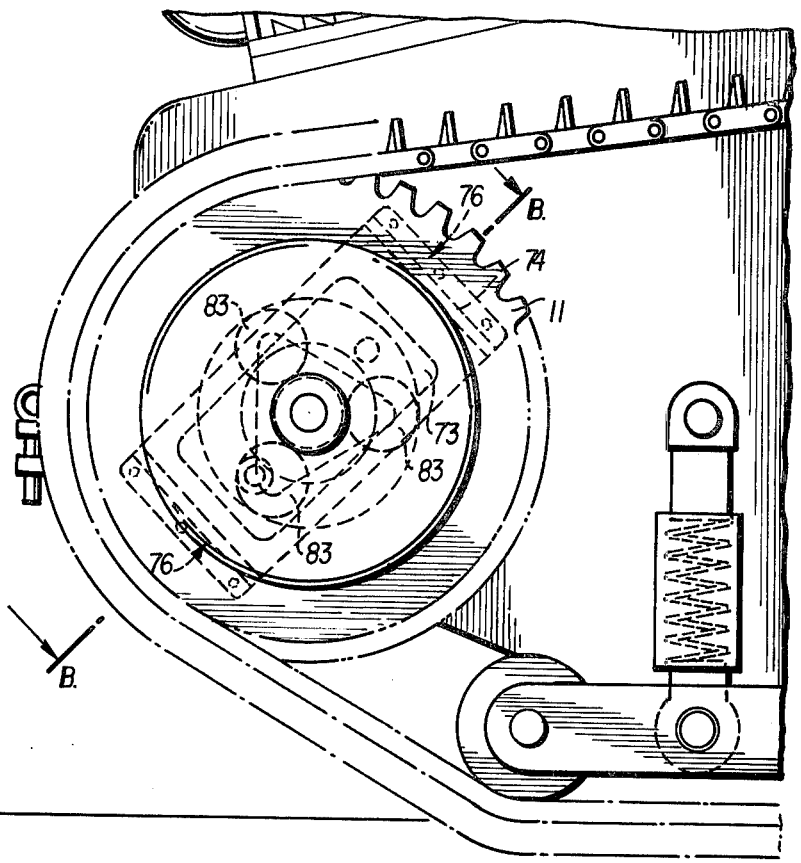
FIG. 4 shows an alternate transmission mechanism connected to the sprocket wheel.
Figure 5:
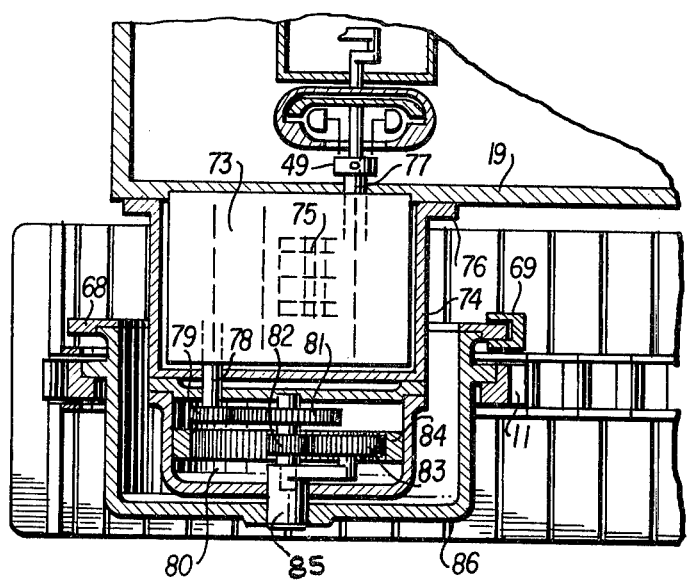
FIG. 5 is a cross section of the sprocket wheel and track chain assembly connection of FIG. 4.

The transmission assembly may be expeditiously removed and reinstalled by loosening the securing bolts holding the transmission flange 70 to the main frame 19 and upon disengagement of the sprocket wheel 11 from the track chain assembly 52, by breaking the chain at its master link. FIG. 4 shows one of several alternative design configurations pertaining to transmission means.

In order to obtain the proper travel speeds and tractive efforts for a crawler, the magnitude of the total rotational speed reduction between the torque convertor output shaft and the sprocket wheel shaft should, for the purposes of this invention, approximate that on crawlers in general use. The particular planetary gearing arrangement shown in Section A—A of FIG. 2 will accomplish said magnitude. Details of its design are more clearly described in U.S. Pat. No. 3,334,702 and will not be further described except as relate to the present invention. With this gearing arrangement, overall reduction in the order of 30 to 1 may be obtained. In conventionally designed crawlers this general magnitude of gear reduction is accomplished, as a rule, within the final drive assembly, with a part in a centrally located level gear/pinion assembly, and the remainder at each end of the drive assembly.

This invention envisions the use of presently produced powershift transmissions, with or without minor design modifications, as needed. The practical scope of available transmissions is enlarged in that numerous models of such transmissions have been developed and are produced both by manufacturers of industrial and construction machinery and by special suppliers. As mentioned previously either planetary type transmissions or counter-shift type transmissions may be employed in this invention.

Referring now to FIG. 4, there is illustrated an example of a typical counter-shaft type transmission employed in combination with a reduction gear arrangement. The transmission assembly 73 is secured to support frame 74 by fastening means 75. The support frame is rigidly secured to main frame 19 by fastening means 76. The transmission input shaft 77 is connected to universal joint 49. Its output shaft 78 is secured to gear 79 of reduction assembly 80. The first stage of gear reduction is accomplished by the small gear 79 meshing with a substantially larger gear 81. The next stage of gear reduction is accomplished by a single planetary set. Gear 81 is secured to sun gear 82, meshing with planet gear 83, which also mesh with the internal ring gear 84 rigidly secured to the housing of assembly 80. The output shaft 85 is secured to said planetary cage and drives sprocket wheel 11 through hub 86. Braking is accomplished, as previously described, by means of the calipers 69.

If the transmission assembly 73 contains three or more speed ranges, the schematic depicted in FIG. 3 would be altered only by the provision of additional solenoid coils and positions for the range control lever. Also, as has been said previously, in this case, additional combinations for regular as well as gradual turn steering modes may be accomplished.

The present invention contains several features relating to maneuverability, ridability and serviceability, which are unique in the construction industry. Reliability, a highly vulnerable consideration in the field, is a main advantage of the present invention, as the transmission employed here is not called upon to perform any functions which differ from those required of conventional installations.

Conventional track-type vehicles, for instance, crawler dozers, are generally driven by two rearwardly mounted sprocket wheels only, and perform their main function while operated in the forward direction only, even though they are frequently equipped, in addition to a blade in front, with equipment such as rippers, etc. mounted in the rear. Thus whether the machine is predominantly being used for ripping or for dozing material, or any given assignment, some productive time can be lost by the necessity of operating in reverse or, by the alternative of performing a 180 degree turn.

The track-type vehicle of the present invention will, with its four sprocket wheel drive and its general symmetry of weight distribution, be capable of performing useful work to an essentially equal degree regardless of its direction of travel. Thus, the tractor, being equipped with a rear-mounted tool suitable for pushing action, such as a modified ripper, and a conventionally front mounted dozer blade, will operate productively while travelling in both directions, to an extent not heretofore known.

In addition to its functional capabilities, as described above, this invention affords novel possibilities and advantages to manufacturers and dealers of construction machinery alike. Since the propulsion and steering mechanisms represent a substantial portion of the total development and tooling cost for introducing given models, the present invention presents new and attractive possibilities to those manufacturers of construction machinery who already have several modes in the "relatively small end" of the line and wish to expand by introducing larger models, but hesitate to do so due to the substantial investment in capital, design and development effort involved. Further, the subject invention may also prove of value to those manufacturers who presently produce a reasonably full line of models, but, in annual quantities which are regarded as marginal from a profit viewpoint. Proliferation of high cost and low volume assemblies and components may be reduced by introducing technically advanced models with higher horsepower capabilities, which would utilize assemblies and components from their lower horsepower counterparts.

For purposes of illustration of this reduction in capital expenditure while increasing the number of variations of a given model the following tables are furnished. Table A lists an assumed line of presently produced models. Table B illustrates how a new line may be produced and arrived at by utilizing the listed critical assemblies in Table A.

Table A:

| Existing Line of Models | |
|---|---|
| Model | Approx. Horsepower |
| A | 50 |
| B | 75 |
| C | 100 |
| D | 125 |
| E | 150 |
| F | 200 |
| G | 250 |
| H | 300 |
| I | 400 |
| J | 500 |

Table B:

New and Higher Horsepower Models, Partly Derived from Existing Models

| New and Expanded Line | | Usage of already available propulsion assemblies, etc., number of each utilized | | | | |
|---|---|---|---|---|---|---|
| Model | Approx. H.P. | Engine 2 from | Torque Conv. 4 from | Trans. 4 from | Trans. Con. Valve* 2 from | Remarks |
| K | 200 | C | A | A | C | New Line in Existing Line |
| L | 300 | E | B | B | E | |
| M | 400 | F | C | C | F | |
| N | 500 | G | D | D | G | |
| O | 600 | H | E | E | H | New Line in Higher H.P. Class |
| P | 800 | I | F | F | I | |
| Q | 1000 | J | G | G | J | |

*used for transmission control as well as for steering control.

The models K, L, M and H would replace present models, but would enhance usage of assemblies and components from the lower horsepower range, models A, B, C, D, E, F and G.

The new and larger models, O, P and Q have been achieved without proliferation of new assemblies, etc., utilizing components already proven in the models E, F, G, H, I and J.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

What is claimed is:

1. A track-type vehicle comprising a frame, having a left side, a right side, a front and a rear, a left side pair of sprocket wheels rotatably mounted on said frame at a point elevated from the ground and operatively engaged with a left side continuous track chain assembly for aiding in a clear operative engagement with said chain assembly, and a right side pair of sprocket wheels rotatably mounted on said frame at a point elevated from the ground and operatively engaged with a right side continuous track chain assembly for aiding in a clear operative engagement with said chain assembly, a front engine and a rear engine, both of said engines mounted transversely on said frame and both having opposing left and right drive shafts for transmitting power to a first and second drive means, respectively, said first drive means including means for transmitting power in different modes and speeds from said left drive shafts of said front and rear engines to said left side pair of sprocket wheels, means for achieving each said mode and speed in response to hydraulic control signals from a transmission hydraulic control means, said second drive means including means for transmitting power in different modes and speeds from said right drive shafts of said front and rear engines to said right side pair of sprocket wheels, means for achieving each said mode and speed in response to hydraulic control signals from a transmission hydraulic control means, said hydraulic transmission control means including solenoid actuated valve means for each said first and second drive means for providing a plurality of distinct hydraulic signals for achieving a particular mode and speed, an operator control for simultaneously actuating each said solenoid actuated valve means for providing an identical control signal to each said first and second drive means to achieve a common mode and speed, and each said solenoid actuated valve means including an operator controlled override means for independently actuating each of said solenoid actuated valve means to provide a plurality of distinct control signals to a respective one of said first and second drive means to achieve a particular mode and speed, whereby the vehicle could be steered in various steering modes.

2. A crawler vehicle having right and left side track chain assemblies, each of said assemblies comprising a front resilient bogie frame, a rear resilient bogie frame, a center bogie frame and a track tension adjusting means, each bogie frame comprising a separate support means for said vehicle for supporting and spacing said vehicle from the ground surface, said front and rear bogie frames each including mounting means for pivotally mounting each frame on its own journal which is secured to the main frame and having an axis perpendicular to the direction of travel of said track chain assemblies, and each said mounting means including resilient means for permitting reciprocal movement of each said bogie frames in a direction perpendicular to its respective axis, whereby said front and rear bogie frames conform to a rough terrain contour, said center bogie frame including mounting means for pivotally mounting said frame on its own journal which is secured to the main frame and having an axis perpendicular to the direction of travel of said track chain assemblies, and said mounting permitting pivotal movement of said bogie frame in a direction perpendicular to its axis, whereby said center bogie frame conforms to a rough terrain contour, at least two track roller assemblies pivotally attached to each of said bogie frames for contacting and guiding the movement of the track chain assembly, said track tension adjusting means comprising resilient support means, a track roller assembly and linkage means, said resilient support means including mounting means at its lower end for pivotally mounting said means on its own journal which is secured to the main frame and having an axis perpendicular to the direction of travel of said track chain assemblies, and including resilient means for exerting a predetermined upward force, said track roller assembly rotatably mounted at opposing end of said resilient support means on a journal which is secured thereto and having an axis perpendicular to the direction of travel of said track chain assemblies, whereby said upward force may be transmitted by said track roller assembly onto a track chain assembly, said linkage means pivotally mounted at one end on its own journal which is secured to the main frame and having an axis perpendicular to the direction of travel of said track chain assemblies and pivotally mounted at its other end on said journal which is secured to said opposing end of said resilient support means, whereby said resilient support means can swing in an arc, 3. In a track-type vehicle propelled by two continuous track chain assemblies, each of which being driven by two individual sprocket wheels, comprising, a front and a rear engine each mounted perpendicularly to longitudinal axis of said vehicle and each of said engines having an engine drive shaft at each end, drive and steering means operatively connecting each of said individual sprocket wheels with an individual engine drive shaft, respectively, and including, a hydrokinetic torque converter having a converter input shaft and a converter output shaft, said converter input shaft operatively connected to said engine drive shaft, for transmitting power into said torque converter, respectively, a multispeed, full reversing power shift transmission, including transmission control means for its operation in various speed and directional modes and having a transmission input shaft and a transmission output shaft, said transmission input shaft operatively connected to said converter output shaft, for transmitting power into said powershift transmission, respectively, said transmission output shaft operatively connected to said sprocket wheel, for transmitting power to said individual sprocket wheel, respectively, manual control means, in an operators compartment of said vehicle, said control means operatively connected with said transmission control means and said manual control means including manual override control means, whereby said track-type vehicle may be propelled at different travel speeds and steered in various steering modes.

4. The track-type vehicle of claim 3 having a main frame and a resilient suspension system for said two continuous track chain assemblies, and wherein each of said sprocket wheels are mounted at an elevated point on said main frame whereby said track chain assemblies conform to a rough terrain contour.

5. The track-type vehicle as of claim 3, wherein said multispeed transmission is a dual speed transmission.

* * * * *